Jan. 8, 1929.
W. A. McELROY
1,698,372
ROLLER BEARING ANKLE JOINT FOR ARTIFICIAL LIMBS
Filed Nov. 7, 1923
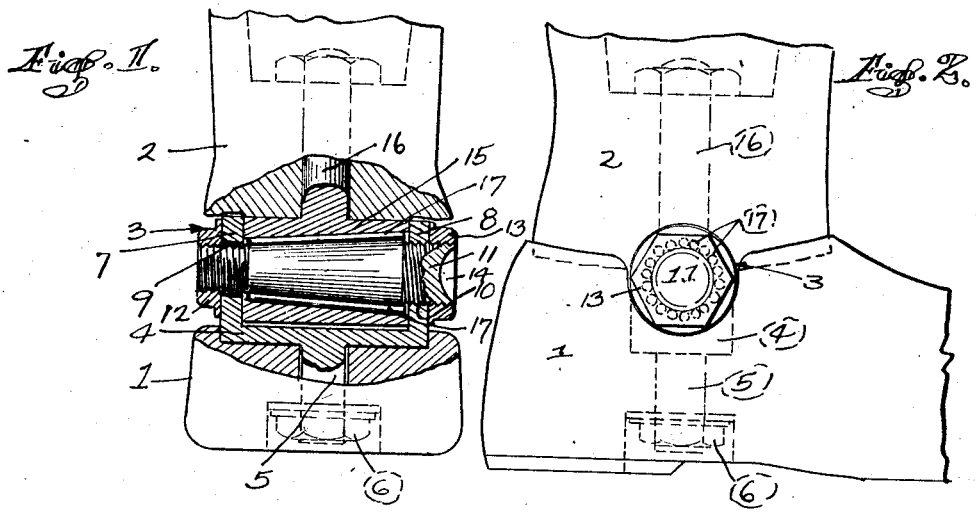
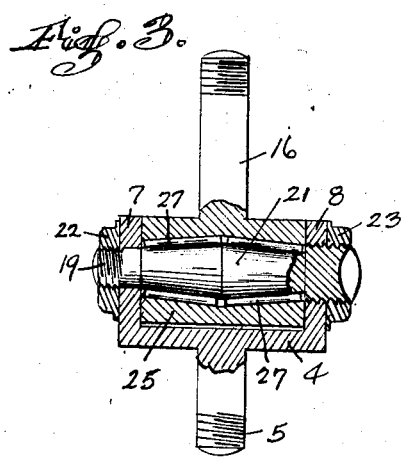
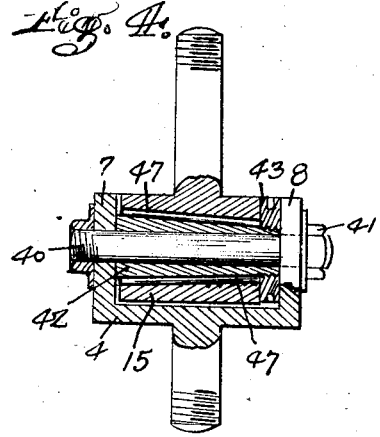
INVENTOR
WILLIAM A. McELROY
BY ATTORNEY
Lincoln Johnson Patented Jan. 8, 1929.

1,698,372

UNITED STATES PATENT OFFICE.

WILLIAM A. McELROY, OF SAN FRANCISCO, CALIFORNIA.

ROLLER-BEARING ANKLE JOINT FOR ARTIFICIAL LIMBS.

Application filed November 7, 1923. Serial No. 673,272.

This invention relates particularly to roller bearing ankle joints for artificial limbs.

An object of the invention is to provide an ankle joint in which the co-acting bearing parts may be adjusted, one relative to the other, for the purpose of tightening the contacting bearing surfaces to compensate for the wear produced by continuous use and to do away with needless lost motion.

A further object of the invention is to provide an adjustable roller bearing ankle joint which may be packed with lubricant, to eliminate the necessity of periodic oiling as is the case at the present time.

A still further object of the invention is to provide an adjustable roller bearing ankle joint for artificial limbs that will be superior in point of simplicity and inexpensive in construction, positiveness in operation, facility and convenience in use and general efficiency, as contrasted with devices of a similar character. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claim following the description, it is desired to cover the invention in whatsoever form it may be embodied.

In the accompanying one sheet of drawings,

Fig. 1 represents a vertical cross-section through an ankle joint constructed in accordance with my invention.

Fig. 2 is an end elevation of Fig. 1.

Fig. 3 is a cross-section through a modified form of ankle joint.

Fig. 4 is a cross-section through a further modified form of ankle joint.

In detail the construction illustrated in the drawings, comprises the foot 1 of an artificial limb and 2 designates the lower end of the calf section of a limb adapted to be attached to the foot by means of the roller bearing, ankle joint generally designated by the reference character 3.

The ankle joint 3 consists of a base member 4 adapted to be set into a depression provided in the foot 1, said base 4 having a shank 5 thereon extending through a hole in the foot 1 for the purpose of receiving an attaching nut 6 for fixedly locking the base 4 and shank 5 on the foot 1. The base 4 is provided with a pair of spaced standards 7 and 8 on the opposite sides thereof each of which have aligned holes therethrough. The hole 9 through the standard 7 is of smaller diameter than the hole 10 through the standard 8, said hole 10 being threaded to receive a pivot pin 11.

The pivot pin 11 is tapered, the smaller end thereof being threaded to pass through the hole 9 in the standard 7 and to be engaged by a lock nut 12 on the outside face of said standard 7. The larger end of the pivot pin is threaded to engage the tapped opening 10 in the standard 8, and a lock nut 13 is adapted to engage said end of the pivot pin. By loosening the lock nuts 12 and 13 the pivot pin 11 can be rotated in its bearing supports in the standards 7 and 8 to impart an endwise or axial movement thereto. Upon tightening the lock nuts 12 and 13 the pivot pin 11 would remain in a fixed position until again re-adjusted. The end of the pivot pin 11 is slotted as at 14 to receive a screw-driver when it is desired to obtain lengthwise movement of said pivot pin 11.

A casing 15 having a tapered hole therethrough is arranged around the shaft 11, said casing 15 being of a length approximately the same as the shank of the pin between the inner faces of the standards 7 and 8. The casing 15 is provided with a shank 16 thereon which is adapted to be secured to the lower end of the calf section 2 of the artificial limb. A plurality of rollers 17 are interposed between the tapered pivot pin 11 and the interior face of the hole through the casing 15.

A bearing formed such as described would have the space around the rollers 17 between the pivot pin 11 and casing 15 packed with lubricant and under ordinary usage should not require attention during the life of the artificial appliance. In the event that usage would produce wear on or between the contacting bearing surfaces it would only be necessary to back up the nuts 12 and 13, move the pivot pin 11 forward to overcome the lost motion, and then tighten the nuts 12 and 13. Thus, a very simple and effectively constructed ankle joint is provided which will prove a boon to the wearers of artificial limbs, an ankle joint which when properly lubricated will require no further attention and which is also provided with means whereby looseness or lost motion may be quickly and easily compensated for.

In the modified form of invention shown in Fig. 3, the operation of the invention is substantially the same as that heretofore described. In Fig. 3, a pivot pin 21 is provided constructed as a double cone, one end of the pivot pin 21 being threaded at 19 for engagement with a lock nut 22 on the outside of the standard 7. The opposite larger end of the pivot pin is threaded for engagement with a lock nut 23 adapted to be moved into and from contact with the outer face of the standard 8. Two sets of rollers 27 would be interposed between the opposite cone faces of the pivot pin 21 and the hole through the casing 25, and said casing would be secured to the calf section 2 of the artificial limb.

In the modification shown in Fig. 4 I provide a base 4, as in Fig. 1, having the respective side standards 7 and 8. A bolt 40 passes through the respective standards 7 and 8 and a lock nut 41 is applied to an end of the bolt 40 for locking said bolt tightly in position between the said standards 7 and 8. A cone shaped or tapered pivot pin 42 is mounted on the shaft 40, said pivot pin 42 being of a shorter length than the distance between the said standards 7 and 8. One end of the pivot pin 42 is threaded to receive an attaching nut 43 and a casing 15 is mounted around the pivot pin 42 between the standards 7 and attaching nut 43. Rollers 47 are arranged between the pivot pin 42 and casing 15 which would be immersed in lubricant, the same as described in Fig. 1. In the event that play would occur between the pivot pin 42 and casing 15 the lock nut 41 would be backed up, permitting the binding nut 43 to be rotated, causing an axial movement of the casing 15 relative to the bolt 40 which would eliminate play or looseness between the contacting bearing parts. After the desired degree of movement would be obtained, the lock nut 41 would be tightened to hold the assembly in the desired relation. The modified forms of the invention shown in Figs. 3 and 4, while structurally different from that shown in Fig. 1, are essentially the same invention functioning to produce the same mode of operation.

Having thus described this invention, what I claim and desire to secure by Letters Patent is:—

An adjustable bearing for artificial limbs comprising a frame having opposite side standards; a pivot pin having threaded ends, one end being in threaded engagement with one standard and having bearing support in the opposed standard, said pivot pin having a tapered bearing portion intermediate the standards and adjustable axially therebetween; lock nuts on the threaded ends of the pivot pin to be impinged against the standards to secure the tapered bearing portion in adjusted position; a casing having a tapered bore to receive the tapered bearing portion of the pivot pin; and rollers interposed between the tapered bore of the casing and the tapered bearing portion of the pivot pin.

In testimony whereof, I have hereunto set my hand at San Francisco, California, this 18th day of October, 1923.

WILLIAM A. McELROY.